Feb. 13, 1968 J. A. COMER 3,368,596
MULTI-PURPOSE TABLE SAW
Filed July 9, 1965 3 Sheets-Sheet 2
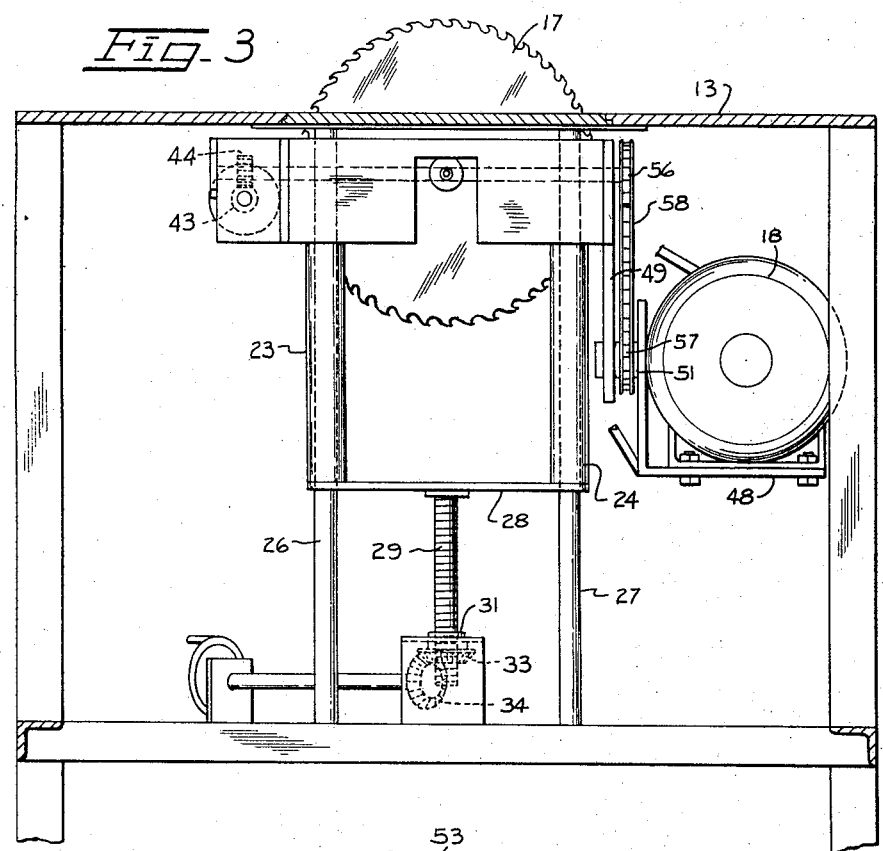
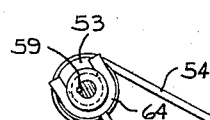
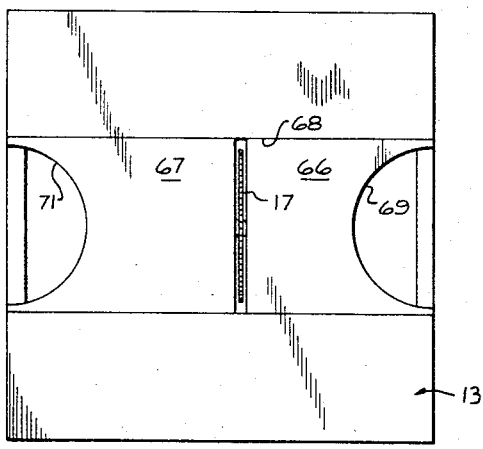
INVENTOR.
JOHN A. COMER
BY
*Gardner & Zimmerman*
ATTORNEYS Feb. 13, 1968  J. A. COMER  3,368,596
MULTI-PURPOSE TABLE SAW
Filed July 9, 1965  3 Sheets-Sheet 3

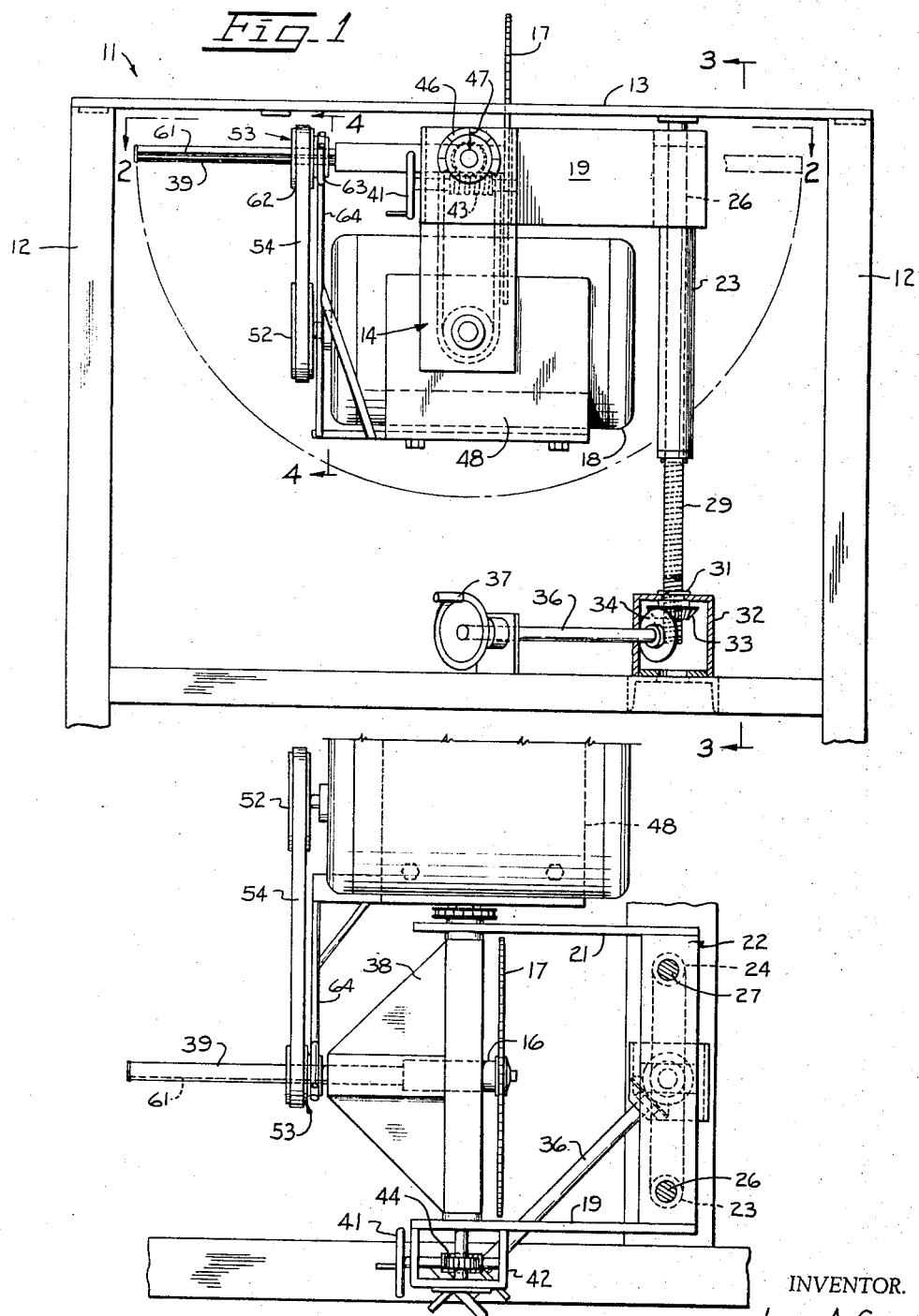

INVENTOR.
JOHN A. COMER
BY
Gardner + Zimmerman
ATTORNEYS

United States Patent Office 3,368,596
Patented Feb. 13, 1968

3,368,596
MULTI-PURPOSE TABLE SAW
John A. Comer, 1949 W. Winton,
Hayward, Calif. 94545
Filed July 9, 1965, Ser. No. 470,758
9 Claims. (Cl. 143—36)

ABSTRACT OF THE DISCLOSURE

A table saw is described in which the plane of the cutting head may be varied through 180° and which is arranged for use with a variety of cutting heads. The saw comprises a table having a carriage mounted subjacent its top for selective vertical translation relative thereto. A yoke mounted on the carriage for pivotal movement through 180° about a horizontal axis has a cutting head spindle journalled therein for rotation about an axis at right angles to the yoke axis. A crank wheel is coupled through suitable gearing to the yoke for selectively rotating such crank wheel through the 180° to position the plane of a cutting head mounted to the spindle at a desired angular position. A motor for driving the cutting head is mounted on the carriage and drive means couple such motor to the spindle in all pivotal positions of the yoke.

This invention relates generally to table saws of the type having a rotary blade or the like extending from a flat table surface, and is more particularly directed to such a saw wherein the plane of the cutting head may be varied through 180° and which is arranged for use with a variety of cutting heads, thereby affording an extreme versatility of cutting and shaping operations with a single tool.

Table saws have long been employed for the cutting of wood, etc., at square cut angles. In some instances the plane of the cutting blade has been variable from the vertical through a limited angular range up to an angle of 45°, typically to only one side of vertical, to facilitate the cutting of miters and the like. It has also been possible to utilize a limited variety of cutting heads other than blades with previous table saws to facilitate various grooving and shaping operations. However, much of the potential versatility of conventional saws has been lost by virtue of the limited range of angular tilt of the plane of the cutting head, not only from the standpoint of the limited angles of cut that may be executed, but also by virtue of various shaper heads and the like requiring that the cutting head spindle be in a horizontal plane.

It is therefore an object of the present invention to provide a table saw or the like having a cutting head, the plane of which may be varied through a full 180°, i.e., between vertical and horizontal on either side of vertical.

Another object of the invention is to provide a multi-purpose table saw of the class described wherein the cutting head spindle is arranged for attachment of a variety of cutting heads such as shapers and groovers, in addition to saw blades.

Yet another object of the invention is the provision of a multi-purpose saw of the class described which is arranged for ready adjustment of the amount of projection of the cutting head from the table to thereby facilitate variation of the depth of cut thereof.

It is a further object of the invention to provide a saw of the class described having a calibrated adjustment of the tilt of the cutting head.

A still further object of the invention is the provision of a multi-purpose table saw which features a quick release spindle to facilitate the interchangeable employment of a variety of cutting heads therewith.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a side elevational view of a multi-purpose saw in accordance with the invention.

FIGURE 2 is a sectional view taken at line 2—2 of FIGURE 1.

FIGURE 3 is a sectional view taken at line 3—3 of FIGURE 1.

FIGURE 4 is a sectional view taken at line 4—4 of FIGURE 1, illustrating particularly a belt drive arrangement of the saw.

FIGURE 5 is a plan view of the saw illustrating particularly reversible guideplates of the table thereof.

Figure 6:
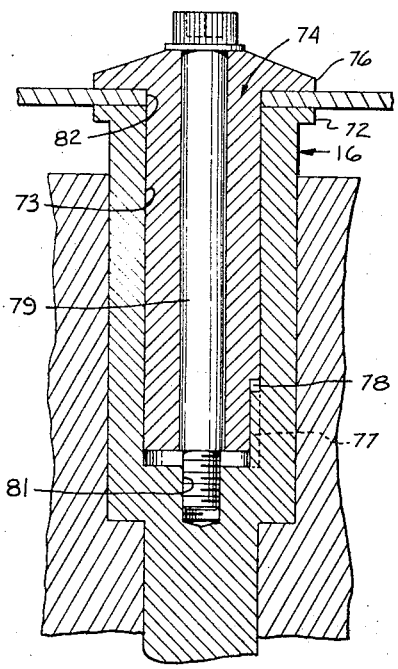
FIGURE 6 is a sectional view on an enlarged scale taken on a diametric plane through the spindle of the saw.

Referring to FIGURES 1–3 in particular, the multi-purpose table saw of the present invention will be seen to include a bench or table 11 including vertical legs 12 supporting a flat horizontal table top 13. A carriage assembly 14 is mounted on the table, preferably in a manner which facilitates selective translation vertically thereof. The carriage assembly includes a spindle 16 to an end of which a circular saw blade 17, or other cutting head, may be secured in normal relation. In accordance with the particularly salient aspects of the invention, the spindle 16 is mounted in the carriage assembly for selective rotation about a horizontal axis, or axis parallel to table top 13, normal to the rotational axis of the spindle. The spindle may thus be selectively rotated through 180° to change the plane of the cutting head to various positions such that a variety of cutting and shaping operations may be accomplished with the one saw. A motor 18 is also mounted on the carriage 14 and coupled in driving relation to the spindle in such a manner that the drive coupling is maintained for any rotatable position of the spindle. In the preferred arrangement of the saw, the drive coupling is accomplished in a relatively simple manner, subsequently described, which does not entail complex gearing.

Considering now the saw in greater detail as to preferred structure, the carriage 14 includes a pair of parallel spaced side members 19, 21 joined at one end by a cross member 22. A pair of sleeves 23, 24 depend from the cross member at transversely spaced positions and slidably engage a pair of vertical guide posts 26, 27 rigidly mounted in the table 11 subjacent the top 13. A cross member 28 is secured between the lower ends of the sleeves 23, 24, and a jack screw 29 depends centrally therefrom. The jack screw threadably engages a nut 31 rotatably mounted in a gear housing 32 mounted in fixed position in the table. The nut is provided with an integral bevel gear 33 within the housing engaged by a bevel gear 34 secured to a positioning shaft 36 journalled in the table for rotation about a horizontal axis. The shaft extends to the front of the table and is thereat secured to a crank wheel 37. Thus, in response to rotation of the crank wheel, the nut 31 is rotated relative to the jack screw 29 which is in turn translated vertically of the table to thereby vary the vertical position of the carriage 14.

To facilitate the previously noted rotation of the spindle 16 about a horizontal axis, a pivotal yoke 38 is journalled transversely between the side members 19, 21 of the carriage. The spindle is journalled in the yoke for rotation about an axis normal to the pivotal axis thereof. A shaft 39 extends integrally from the spindle through the yoke and projects externally therefrom. Selective pivoting of the yoke is accomplished as by means of a crank wheel 41 journalled on a bracket 42 mounted on one side member 19. The crank wheel is secured to a worm gear 43 journalled within the bracket and engaging a spur gear 44 secured to an end of the pivot shaft of the yoke which extends through the bracket in right angular relation to the worm gear. Thus, upon rotation of the crank wheel 41, the worm gear, in engaging the spur gear, pivots the yoke to thereby vary the position of the spindle in either direction between horizontal and vertical. In order to indicate the angle of tilt of the spindle, a calibrated dial 46 is secured to the exterior of the bracket, and an indicator pointer 47 projects radially from the pivot shaft of the yoke to be rotatable therewith adjacent the dial. Thus, as the crank wheel is rotated to pivot the yoke, the angle of tilt is indicated on the dial by the pointer.

The motor 18 is mounted upon the carriage assembly 14 preferably by means of a bracket 48 pivotally secured to a hanger arm 49 depending from side member 21 adjacent one end thereof. The bracket 48 is provided with a pivot shaft 51 projecting transversely into journalled relation to the hanger arm 49. The bracket is thus pivotal about an axis parallel to that of the yoke. The motor as supported on the bracket is disposed downwardly and to one side of the yoke, as best shown in FIGURE 3. The drive shaft of the motor is provided with a pulley 52 and a pulley 53 is secured to the projecting end of the spindle shaft 39. A belt 54 extending about the pulleys then provides a substantially direct drive which does not entail complex gearing. Of course in order for the belt and pulley drive to be employed, the motor drive shaft and spindle shaft must be maintained parallel for all pivoted positions of the yoke. It is for this reason that the motor bracket is pivotal. More particularly, sprockets 56, 57 are respectively secured to the yoke pivot shaft and bracket pivot shaft 51 and are engaged by a chain 58 such that the yoke and bracket are pivotal with each other. With the yoke and bracket suitably indexed, relative to each other the motor drive shaft and spindle shaft are maintained parallel during pivotal movement of the yoke and bracket in concert.

By virtue of the pivot axes of the yoke and motor bracket being offset, the pulleys 52, 53 would not normally be maintained in planar relation during pivotal movement of the yoke and bracket. The belt 54 would thus not be maintained in engagement with the pulleys. This difficulty is overcome in the structure of the present invention by providing for the shifting of one pulley 53 relative to the other pulley 52, as the yoke and bracket are pivoted, to maintain the pulleys in planar relation. More particularly, the pulley 53 is slidable longitudinally along the spindle shaft 39 while being rotatable therewith. In this regard, the pulley is preferably provided with a key 59 engaging a keyway 61 provided longitudinally of the shaft 39 (see FIGURE 4). In addition, the pulley 53 is of the double pulley variety having two annular peripheral grooves 62, 63. One groove 62 receives the belt 54, while the other groove 63 serves to receive a shifting fork 64 rigidly secured to the motor bracket 48. The fork projects upwardly and forwardly from the bracket into engagement with the groove 63, and as the yoke and bracket are rotated, the fork shifts the pulley 53 along the shaft 39 to maintain a planar relation with pulley 52. It will thus be appreciated that a drive coupling is maintained between the motor and spindle for all positions of tilt set by rotating the crank wheel 41.

Figure 7:
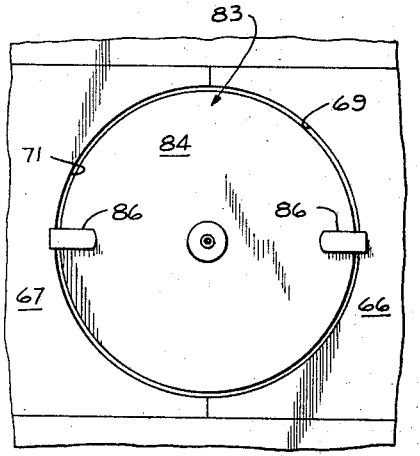
FIGURE 7 is a fragmentary plan view of the saw illustrating the use of a shaper head therewith.

As noted previously, the spindle may be set in any angular position from vertical to horizontal. Thus, the plane of the saw blade 17 or other cutting head may be set to any desired angular position including horizontal, as well as vertical. In order to support a work piece when the cutting head is in either of these extreme positions, the table top 13 is provided with a pair of support plates 66, 67 arranged to be removably positioned in a rectangular opening 68 in the table top provided with support lips along the sides thereof. The plates 66, 67 are respectively provided with semi-circular cut-outs 69, 71 in first ends thereof while the second ends are square. Thus, when the cutting head is vertical, the plates may be positioned in the top opening with the square ends thereof adjacent the blade, as shown in FIGURE 5, to provide a narrow slot through which the cutting head extends. However, when the cutting head is horizontally positioned, the plates are reversed such that the cut-outs 69, 71 are adjacent the blade and define a circular opening thereabout, as shown in FIGURE 7. The plates thus provide support to a work piece for any position of the cutting head.

In order that a variety of cutting heads may be removably secured to the spindle in a ready manner, the spindle features a quick release cutting head fastening means as shown in FIGURE 6. More particularly, the upper end of the spindle is provided with an outwardly flared annular flange 72 and a cylindrical recess 73 extends coaxially thereinto. The recess receives a cylindrical plug 74 formed with an outwardly flared annular flange 75 at its outer end. In addition, a key 77 at the base of the recess engages a keyway 78 adjacent the interior end of the plug. The plug has an axial bore through which a collar bolt 79 extends to threadably engage a tap 81 at the base of the recess. Thus, to fasten a cutting head to the spindle, it is only necessary to insert the plug 74 through the central aperture 82 of the head and into the recess to a position in which the key is engaged in the keyway. The bolt 79 is then tightened into the tap to secure the cutting head to the spindle. To release the cutting head, the reverse procedure is followed.

Figure 8:
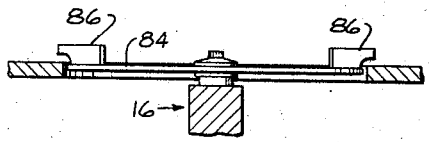
FIGURE 8 is a sectional view on a diametric plane of the shaper head of FIGURE 7.
Figure 9:
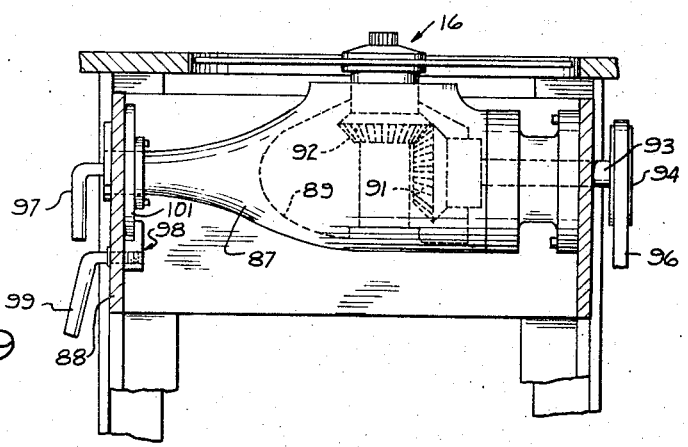
FIGURE 9 is a sectional view in an elevational plane of a modified form of the multi-purpose saw.

As noted previously, since the spindle may be tilted to position a cutting head in a horizontal plane, cutting heads other than saw blades may be used in the saw of the present invention. This is illustrated in FIGURES 7 and 8 which show a shaper head 83 secured to the spindle. Such head includes a circular disc 84 having shaping elements 86 secured to diametrically opposed positions thereof A modified form of the invention is shown in FIGURE 9 wherein a right angular gear drive is employed to drive the spindle 16, and it is not necessary to pivot the motor in conjunction with pivoting of the spindle. In this regard, a yoke 87 is provided having its opposite ends pivotally secured to a carriage 88 which may be vertically translatable in a manner similar to that described with respect to the previous embodiment. The yoke is hollow as indicated at 89 to house right angularly related bevel gears 91, 92. A shaft 93 is secured to one bevel gear 91 and is rotatable coaxially of the pivot axis of the yoke. The shaft projects from the yoke and a pulley 94 is secured to the end of the shaft to receive a belt 96 driven by a motor (not shown) mounted in fixed position on the carriage. The spindle 16 is secured to the other bevel gear 92 and projects from the yoke at right angles to the pivot axis thereof. The bevel gears facilitate rotation of the spindle about an axis at right angles to the pivot axis of the yoke in response to driven rotation of the shaft 93. The yoke may be pivoted about its pivot axis to thereby vary the tilt of the spindle through 180° to any angle between vertical and horizontal and correspondingly vary the planar position of a cutting head secured to the spindle. To facilitate pivotal movement of the yoke, a hand crank 97 is rigidly secured thereto. In addition, a brake 98 operable by a hand crank 99 is carried by the carriage for selective clamping engagement with a disc 101 secured to the yoke. With the hand crank 99 manipulated to loosen the brake, the yoke may be pivoted by hand crank 97 to any desired position and locked therein by tightening the brake against the disc 101. Thus, as in the case of the previously described embodiment, the embodiment of FIGURE 9 facilitates a variety of cutting and shaping operations by virtue of the selective tilting of the cutting head through a full 180°.

What is claimed is:

1. In a table saw of the type having a spindle for receiving a cutting head and rotating same adjacent a flat top and a motor coupled to said spindle for rotatably driving same, the improvement comprising means mounting said spindle for pivotal movement about an axis at right angles to the rotational axis thereof and parallel to said top through an angle of 180°, and means for selectively pivoting said spindle about the pivot axis thereof to any desired angle, said spindle having quick release fastening means for the attachment of different cutting heads thereto.

2. A table saw comprising a table including a flat top having an opening and supported by vertical leg elements, a carriage mounted in said table subjacent said top for selective vertical translation relative thereto, a yoke mounted on said carriage for pivotal movement through 180° about horizontal axis, a spindle journalled in said yoke for rotation about an axis at right angles to the pivot axis thereof, said spindle adapted for the securance of a cutting head thereto, means coupled to said yoke for selectively rotating same through the 180° of pivotal movement thereof to position the plane of a cutting head secured to said spindle at angular positions within said opening in either direction between vertical and horizontal, a motor carried by said carriage, and drive means coupling said motor to said spindle in all pivotal positions of said yoke.

3. A table saw according to claim 2, further defined by said motor being mounted in fixed position on said carriage and having a drive shaft with a coaxial pulley rotatable about an axis parallel to the pivot axis of said yoke, and said drive means including a second shaft journalled for rotation in said yoke coaxially of the pivot axis thereof, right angular gearing coupling said second shaft to said spindle, a pulley coaxially secured to said second shaft, and a belt extending about said first and second pulleys.

4. A table saw according to claim 2, further defined by a bracket pivotally secured to said carriage for movement about an axis parallel to and vertically offset from the pivot axis of said yoke, said motor secured to said bracket and having a drive shaft with a pulley coaxially secured thereto rotatable about an axis normal to the pivotal axis of the bracket, means coupling said bracket to said yoke for coordinated pivotal movement maintaining said drive shaft in parallel relation to said spindle, and said drive means including a second shaft journalled for rotation in said yoke in coaxial relation to said spindle and secured thereto, a second pulley coaxially secured to said second shaft, a belt extending about said first and second pulleys, and means associated with said pulleys for maintaining them in planar relationship during pivotal movement of said yoke and bracket.

5. A table saw comprising a table including a flat top having an opening and supported by vertical leg elements, a carriage mounted in said table subjacent said top for selective vertical translation relative thereto, a yoke mounted on said carriage for pivotal movement through 180° about a horizontal axis, a bracket mounted on said carriage in laterally and downwardly offset relation to said yoke for pivotal movement about a horizontal axis parallel to the pivot axis of said yoke, a spindle journalled in said yoke for rotation about an axis at right angles to the pivot axis thereof, said spindle adapted for securance of a cutting head coaxially thereto, means coupled to said yoke for selectively rotating same through the 180° of pivotal movement thereof to position the plane of a cutting head secured to said spindle at angular positions within said opening in either direction between vertical and horizontal, a motor secured to said bracket and having a drive shaft with a pulley coaxially secured thereto rotatable about an axis normal to the pivotal axis of said bracket, means coupling said bracket to said yoke for coordinated pivotal movement maintaining said drive shaft in parallel relation to said spindle, a second shaft journalled for rotation in said yoke in coaxial relation to said spindle and secured thereto, a second pulley keyed coaxially to said second shaft and movable longitudinally thereof, said second pulley having a pair of annular peripheral grooves, a belt extending about said first pulley and a first of said grooves of said second pulley, and a fork engaging the second of said grooves of said second pulley and rigidly secured to said bracket to maintain said second pulley in planar relation to said first pulley during pivotal movement of said yoke and bracket.

6. A table saw according to claim 5, further defined by a pair of reversible plates supported in said opening of said table top, each plate having a square end edge and a second end edge with a semi-circular cut-out therein.

7. A table saw according to claim 5, further defined by said spindle having a cylindrical recess therein with a tap in the base thereof, a plug insertable through a central aperture of a cutting head disposed within said recess and having an axial bore therethrough, and a collar bolt extending through said bore and threadably engaging said tap.

8. A table saw according to claim 5, further defined by a jack screw secured between said carriage and said table, a gear housing, a nut rotatably mounted on said housing and threadably engaging said screw, right angularly related bevel gears within said housing, one of said gears secured to said nut, a positioning shaft secured to the second of said bevel gears, and a crank wheel secured to said positioning shaft to rotate same and rotate said nut to vertically translate said screw.

9. A table saw according to claim 5, further defined by a spur gear secured to said yoke for rotation with said yoke about the pivotal axis thereof, a worm gear engaging said spur gear, a crank wheel secured to said worm gear to rotate same, an indicator pointer secured to said yoke for rotation therewith about its pivotal axis, and a calibrated disc engaged by said pointer for indicating the angle of tilt of said yoke.

References Cited

UNITED STATES PATENTS

| | | | |
|---|---|---|---|
| 2,347,374 | 4/1944 | Stahler. | |
| 2,464,660 | 3/1949 | White | 143—35 |
| 2,792,858 | 5/1957 | Bryant. | |
| 3,011,533 | 12/1961 | Newman. | |

WILLIAM W. DYER, JR., *Primary Examiner.*

W. D. BRAY, *Assistant Examiner.*